(12) United States Patent
Itami et al.

(10) Patent No.: US 7,420,723 B2
(45) Date of Patent: Sep. 2, 2008

(54) OPTICAL DEFLECTOR, PRODUCTION METHOD THEREOF, OPTICAL SCANNING DEVICE, AND IMAGE FORMING APPARATUS

(75) Inventors: Yukio Itami, Kanagawa (JP); Kazuhiro Koseki, Miyagi (JP); Makoto Endo, Miyagi (JP); Yoshihiro Takahashi, Miyagi (JP); Tomotaka Takamura, Miyagi (JP); Noriyuki Kadowaki, Miyagi (JP); Takeshi Kikuchi, Miyagi (JP); Hidetoshi Kojima, Miyagi (JP); Takao Abe, Miyagi (JP); Masao Hatayama, Miyagi (JP)

(73) Assignees: Ricoh Company, Ltd., Tokyo (JP); Tohoku Ricoh Co., Ltd., Shibata-gun (JP)

( * ) Notice: Subject to any disclaimer, the term of this patent is extended or adjusted under 35 U.S.C. 154(b) by 0 days.

(21) Appl. No.: 11/616,173

(22) Filed: Dec. 26, 2006

(65) Prior Publication Data

US 2007/0153349 A1 Jul. 5, 2007

(30) Foreign Application Priority Data

Dec. 26, 2005 (JP) ............................. 2005-373604

(51) Int. Cl.
*G02B 26/08* (2006.01)
(52) U.S. Cl. .................................................... 359/216
(58) Field of Classification Search ................ 359/204, 359/216–218
See application file for complete search history.

(56) References Cited

U.S. PATENT DOCUMENTS

| | | | |
|---|---|---|---|
| 7,145,705 B2 * | 12/2006 | Hayashi | 359/204 |
| 7,215,454 B2 * | 5/2007 | Paul et al. | 359/216 |
| 7,277,212 B2 * | 10/2007 | Miyatake et al. | 359/205 |
| 2007/0153349 A1 | 7/2007 | Itami et al. | |

FOREIGN PATENT DOCUMENTS

| | | |
|---|---|---|
| JP | 2003-315720 | 11/2003 |
| JP | 2005-92129 | 4/2005 |
| JP | 2005-352059 | 12/2005 |

OTHER PUBLICATIONS

U.S. Appl. No. 11/613,445, filing Dec. 20, 2006, Itami.
U.S. Appl. No. 11/616,173, filed Dec. 26, 2006, Itami et al.
U.S. Appl. No. 11/851,544, filed Sep. 7, 2007, Itami.

* cited by examiner

*Primary Examiner*—Euncha P Cherry
(74) *Attorney, Agent, or Firm*—Oblon, Spivak, McClelland, Maier & Neustadt, P.C.

(57) ABSTRACT

An optical deflector, a method of producing the optical deflector, an optical scanning device, and an image forming apparatus are disclosed that are able to save resources, provide high reliability at low cost, and enable stacked and relatively-offset polygon mirrors to be arranged precisely. The optical deflector includes a rotary member supported by a bearing with plural polygon mirrors fixed thereon. The polygon mirrors are stacked along a rotation axis of the rotary member, the polygon mirrors are relatively offset by a predetermined angle in a rotation plane of the rotary member, and an effective deflection area of each of the reflection surfaces of any one of the polygon mirrors is positioned away from a center of the corresponding reflection surfaces of the other one of the polygon mirrors in the direction of the rotation axis.

12 Claims, 12 Drawing Sheets

OPTICAL DEFLECTOR, PRODUCTION METHOD THEREOF, OPTICAL SCANNING DEVICE, AND IMAGE FORMING APPARATUS

BACKGROUND OF THE INVENTION

1. Field of the Invention

The present invention relates to an optical deflector, a method of producing the optical deflector, an optical scanning device, and an image forming apparatus, and particularly, to an optical deflector, a method of producing the optical deflector, an optical scanning device, and an image forming apparatus used in a color image forming apparatus.

2. Description of the Related Art

An image forming apparatus employing an electrophotographic process is used in a laser printer, a digital multifunction machine, a common facsimile machine, and so on. In such an image forming apparatus, along with realization of color image formation and high speed of image formation, a tandem image forming apparatus is widely used which has plural (usually four) photoconductors.

For example, Japanese Laid-Open Patent Application No. 2005-92129 discloses an optical deflector used in a color image formation apparatus, which optical deflector includes plural polygon mirrors laminated in a rotation axis direction, and deflection reflection surfaces of different stages of the polygon mirrors are fixed while being inclined relative to each other in the rotation direction to form a preset angle between the deflection reflection surfaces of different stages of the polygon mirrors in the rotation direction. Such a color image formation apparatus is capable of high-speed image output with a lesser number of light sources in an optical scanning device, and thus, the cost of the image formation apparatus is low. In addition, since the number of the light sources is reduced, the probability of trouble occurring in the light sources is low, and thus the image formation apparatus is of high reliability.

However, the techniques in the related art suffer from the following problems.

In the related art, when fabricating an optical deflector, since it is difficult to machine plural deflection reflection surfaces with those deflection reflection surfaces in an integrated state, usually, two polygon mirrors are machined separately, specifically, deflection reflection surfaces of the polygon mirrors are machined separately in advance, and the polygon mirrors are then laminated and assembled to form a polygon scanner. In this case, it is difficult to precisely incline the laminated polygon mirrors in the rotation direction by a desired angle and precisely fix the polygon mirrors without damaging the deflection reflection surfaces. In addition, due to imposed thermal stress, or acceleration or de-acceleration operations for starting or stopping, the polygon mirrors may shift from their original positions along with time, which causes imbalance of the rotary member and produces large rotational vibration.

SUMMARY OF THE INVENTION

An embodiment of the present invention may solve one or more problems of the related art.

A preferred embodiment of the present invention may provide an optical deflector, a method of producing the optical deflector, an optical scanning device, and an image forming apparatus which can save resources, are of high reliability and low cost, enable laminated polygon mirrors to be arranged precisely with a relative-rotated angle between the polygon mirrors, and are able to prevent the polygon mirrors from deviating from an original position, thus prevent imbalance of the polygon mirrors and resulting large rotational vibration even when a thermal stress is imposed, or during acceleration or de-acceleration operations for starting or stopping the optical deflector.

According to a first aspect of the present invention, there is provided an optical deflector, comprising:

a rotary member that is supported by a bearing and is driven to rotate by a motor, a plurality of polygon mirrors being fixed on the rotary member, each of the polygon mirrors having a plurality of reflection surfaces, wherein the polygon mirrors are laminated in a direction of a rotation axis of the rotary member, the polygon mirrors are arranged so that each of the reflection surfaces of one of the polygon mirrors is offset relative to the corresponding one of the reflection surfaces of another one of the polygon mirrors by a predetermined angle in a rotation plane perpendicular to the rotation axis, and an effective deflection area of each of the reflection surfaces of any one of the polygon mirrors is positioned away from a center of the corresponding reflection surfaces of the other one of the polygon mirrors in the direction of the rotation axis.

As an embodiment, each of the reflection surfaces of each of the polygon mirrors has an arc-shaped boundary.

As an embodiment, the polygon mirrors are made individually, and are fixed to a bearing shaft of the rotary member by shrinkage fit and are integrated together.

As an embodiment, the polygon mirrors form a single part.

As an embodiment, the polygon mirror as a single part is machined by forging.

As an embodiment, corners of the reflection surfaces of the polygon mirrors on an interface of adjacent polygon mirrors are cut off. For example, a surface formed by cutting off one of the corners of the reflection surfaces is a plane surface.

According to a second aspect of the present invention, there is provided a method of fabricating an optical deflector having a rotary member that is supported by a bearing and is driven to rotate by a motor, a plurality of polygon mirrors fixed on the rotary member, each of the polygon mirrors having a plurality of reflection surfaces, wherein the polygon mirrors are laminated in a direction of a rotation axis of the rotary member, the polygon mirrors are arranged so that each of the reflection surfaces of one of the polygon mirrors is offset relative to the corresponding one of the reflection surfaces of another one of the polygon mirrors by a predetermined angle in a rotation plane perpendicular to the rotation axis, and an effective deflection area of each of the reflection surfaces of any one of the polygon mirrors is positioned away from a center of the corresponding reflection surfaces of the other one of the polygon mirrors in the direction of the rotation axis, said method comprising the step of:

forming each of the reflection surfaces by mirror processing in a longitudinal direction of the reflection surface with the laminated polygon mirrors being integrated together.

According to a third aspect of the present invention, there is provided an optical scanning device, comprising:

an optical system that includes an optical deflector and directs a light beam from a light source to a scanning surface through the optical system to form a light spot on the scanning surface, said optical deflector deflecting the light beam to form a scan line on the scanning surface, wherein the optical deflector includes a rotary member that is supported by a bearing and is driven to rotate by a motor, a plurality of polygon mirrors fixed on the rotary member, each of the polygon mirrors having a plurality of reflection surfaces, wherein the polygon mirrors are laminated in a direction of a rotation axis of the rotary member, the polygon mirrors are arranged so that each of the reflection surfaces of one of the polygon mirrors is offset relative to the corresponding one of the reflection surfaces of another one of the polygon mirrors by a predetermined angle in a rotation plane perpendicular to the rotation axis, and an effective deflection area of each of the reflection surfaces of any one of the polygon mirrors is positioned away from a center of the corresponding reflection surfaces of the other one of the polygon mirrors in the direction of the rotation axis.

According to a fourth aspect of the present invention, there is provided an optical scanning device, comprising:

an optical system that includes an optical deflector and directs a plurality of light beams from a light source to a scanning surface through the optical system to form a plurality of light spots on the scanning surface, said optical deflector deflecting the light beams to form plural scan lines on the scanning surface, wherein the optical deflector includes a rotary member that is supported by a bearing and is driven to rotate by a motor, a plurality of polygon mirrors being fixed on the rotary member, each of the polygon mirrors having a plurality of reflection surfaces, wherein the polygon mirrors are laminated in a direction of a rotation axis of the rotary member, the polygon mirrors are arranged so that each of the reflection surfaces of one of the polygon mirrors is offset relative to the corresponding one of the reflection surfaces of another one of the polygon mirrors by a predetermined angle in a rotation plane perpendicular to the rotation axis, and an effective deflection area of each of the reflection surfaces of any one of the polygon mirrors is positioned away from a center of the corresponding reflection surfaces of the other one of the polygon mirrors in the direction of the rotation axis.

According to a fifth aspect of the present invention, there is provided an image forming device, comprising:

a photoconductor having a photoconductive surface, an optical scanning device that directs a light beam from a light source to the photoconductor to scan the photoconductive surface and form a latent image on the photoconductive surface, and a unit that converts the latent image to a visible image, wherein the optical scanning device includes an optical system that includes an optical deflector to deflect the light beam and form a scan line on the photoconductive surface of the photoconductor, the optical deflector includes a rotary member that is supported by a bearing and is driven to rotate by a motor, a plurality of polygon mirrors fixed on the rotary member, each of the polygon mirrors having a plurality of reflection surfaces, wherein the polygon mirrors are laminated in a direction of a rotation axis of the rotary member, the polygon mirrors are arranged so that each of the reflection surfaces of one of the polygon mirrors is offset relative to the corresponding one of the reflection surfaces of another one of the polygon mirrors by a predetermined angle in a rotation plane perpendicular to the rotation axis, and an effective deflection area of each of the reflection surfaces of any one of the polygon mirrors is positioned away from a center of the corresponding reflection surfaces of the other one of the polygon mirrors in the direction of the rotation axis.

According to a sixth aspect of the present invention, there is provided an image forming device, comprising:

a photoconductor having a photoconductive surface, an optical scanning device that directs a plurality of light beams from a plurality of light sources to the photoconductor to scan the photoconductive surface and form a latent image on the photoconductive surface, and a unit that converts the latent image to a visible image, wherein the optical scanning device includes a scanning optical system that includes an optical deflector to deflect the light beams and form a plurality of scan lines on the photoconductive surface of the photoconductor, the optical deflector includes a rotary member that is supported by a bearing and is driven to rotate by a motor, a plurality of polygon mirrors fixed on the rotary member, each of the polygon mirrors having a plurality of reflection surfaces, wherein the polygon mirrors are laminated in a direction of a rotation axis of the rotary member, the polygon mirrors are arranged so that each of the reflection surfaces of one of the polygon mirrors is offset relative to the corresponding one of the reflection surfaces of another one of the polygon mirrors by a predetermined angle in a rotation plane perpendicular to the rotation axis, and an effective deflection area of each of the reflection surfaces of any one of the polygon mirrors is positioned away from a center of the corresponding reflection surfaces of the other one of the polygon mirrors in the direction of the rotation axis.

According to the present invention, polygon mirrors are laminated in the direction of the rotation axis of the rotary member to be integrated together, while the polygon mirrors are relatively rotated by a predetermined angle in the rotation direction of the rotary member; further, the effective deflection areas of the deflection reflection surfaces of the polygon mirrors are located away from the centers of the deflection reflection surfaces in the direction of the rotation axis of the rotary member.

Due to this, it is possible to process the deflection reflection surfaces of the polygon mirrors with the polygon mirrors being integrated together. Therefore, the laminated polygon mirrors can be arranged precisely while being relatively rotated by a predetermined angle in the rotation direction of the rotary member. Due to this, even when a thermal stress is imposed, or during acceleration or de-acceleration operations for starting or stopping the rotary member, the polygon mirrors can hardly shift from their original positions to cause imbalance of the rotary member and produce large rotational vibration.

These and other objects, features, and advantages of the present invention will become more apparent from the following detailed description of preferred embodiments given with reference to the accompanying drawings.

DESCRIPTION OF THE PREFERRED EMBODIMENTS

Below, preferred embodiments of an optical deflector, a method of producing the optical deflector, an optical scanning device, and an image forming apparatus according to the present invention are explained with reference to the accompanying drawings.

First Embodiment

Figure 1:
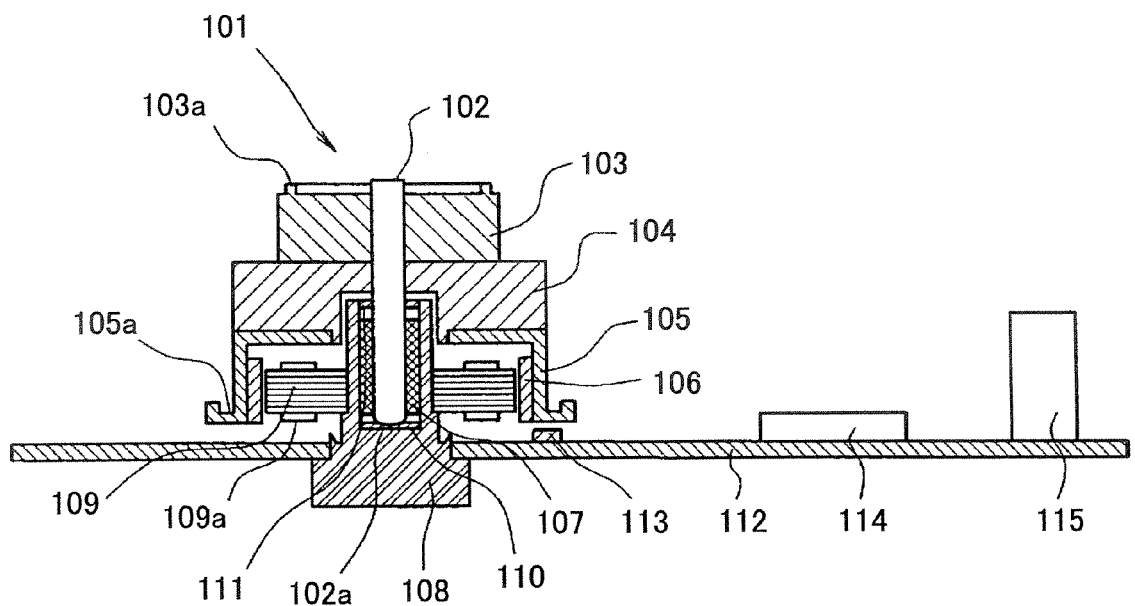
FIG. 1 is a cross-sectional view of an optical deflector including a rotary member according to a first embodiment of the present invention.

FIG. 1 is a cross sectional view of an optical deflector including a rotary member according to a first embodiment of the present invention.

Figure 2:
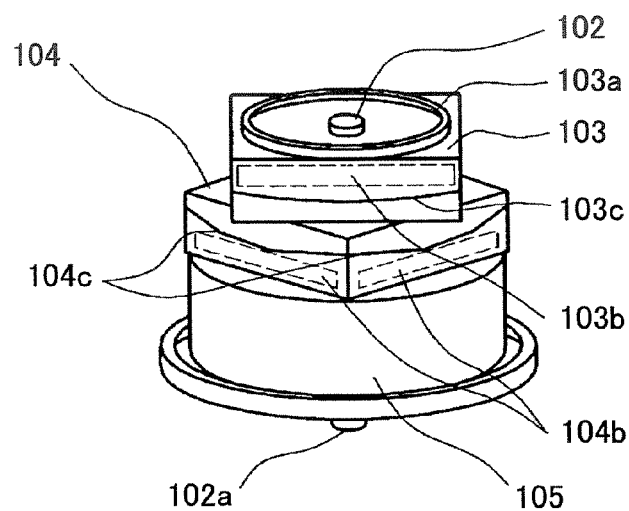
FIG. 2 is a perspective view of the optical deflector according to the first embodiment of the present invention.

FIG. 2 is a perspective view of the optical deflector according to the first embodiment of the present invention.

As shown in FIG. 1 and FIG. 2, a rotary member 101 of the optical deflector of the present embodiment includes polygon mirrors 103, 104, which are fixed to the outer surface of the bearing shaft 102 by shrinkage fit, a flange 105 attached to the polygon mirror 104, and a rotor magnet 106 attached to the flange 105.

A radial oil retaining bearing includes the bearing shaft 102 and a fixture sleeve 107. A bearing gap is less than 10 μm along the diameter direction of the bearing shaft 102. In order to secure stability during high speed rotation, the radial bearing has dynamic pressure generation grooves (not illustrated). The dynamic pressure generation grooves are provided on the outer surface of the bearing shaft 102, or on the inner surface of the fixture sleeve 107, and preferably, on the inner surface of the fixture sleeve 107 formed from a sintered member of good machining properties.

Preferably, the bearing shaft 102 may be formed from martensitic stainless steel, such as SUS420J2, which is of good abrasion resistance and is quenchable, resulting in a high surface hardness.

The flange 105 is below and attached to the polygon mirror 104, and is fixed by caulking or adhesive bonding.

The rotor magnet 106 is fixed on the inner surface toward the bottom of the flange 105; the rotor magnet 106 and a stator core 109 (a winding coil 109a) fixed on a bearing housing 108 constitute an outer rotor brushless motor. The rotor magnet 106 is bonded using a resin as a binder, and the outside diameter portion of the rotor magnet 106 is held by the flange 105. The rotor magnet 106 may be fixed to the flange 105 by an adhesive agent; however, it is preferable to fix the rotor magnet 106 by press fitting, because this results in an even high rotation speed, does not causes small movement of the fixing portion even in a high temperature environment, and can maintain balance of the rotary member 101 at high precision.

An axial pivot bearing brings a convex curved surface 102a formed on the bottom surface of the bearing shaft 102 into contact with a thrust cup member 110.

For example, the thrust cup member 110 may be formed from resin materials to improve lubricity. Alternatively, the thrust cup member 110 may be formed from martensitic stainless steel, ceramic, or metal materials, and hardening treatment such as diamond-like-carbon (DLC) treatment can be performed on the surface of the thrust cup member 110 to prevent generation of abrasive powder.

The thrust cup member 110 and the fixture sleeve 107 are held in the bearing housing 108, and a fluid seal 111 is used to prevent outward flow of the oil.

When the rotary member 101 is rotated at a speed of 25000 rpm or higher, in order to reduce vibration, it is necessary to balance the rotary member 101 precisely, and maintain the balance of the rotary member 101 precisely. There are two portions of the rotary member 101 used for imbalance correction; one is at an upper position, and the other one is at a lower position. Specifically, as the one at the upper position, a circular depression 103a is formed on the mirror 103; as the one at the lower position, a circular depression 105a is formed on the flange 105, and an adhesive agent is applied on the circular depression 103a and the circular depression 105a for balance correction. It is required that the imbalance be less than 10 mg·mm, for example, at a position having a radius of 10 mm, the correction should be less than 1 mg.

When carrying out the above fine adjustment, if it is difficult to control the imbalance due to attachment to the adhesive agent, or if the adhesive agent is detached or scattered at a rotational speed as high as 40000 rpm or more due to a small amount of the adhesive agent and thus a weak adhesive force, it is preferable to eliminate some of the weight of the rotary member 101, for example, by drill grinding or laser machining.

In the present embodiment, the motor system is an outer rotor motor in which where is a magnetic gap in the radial direction, and the rotor magnet 106 is placed on the outside diameter portion of the stator core 109. In addition, rotational driving is performed in the following way. That is, a signal is output from a Hall device 113 mounted on a circuit board 112, which is referred to as a position signal, through the magnetic field of the rotor magnet 106. Then excitation switching of the winding coil 109a is carried out by a driving IC 114, thereby causing rotational motion. The rotor magnet 106 is magnetized in the radial direction, and a rotational torque is produced between the rotor magnet 106 and the outer surface of the stator core 109, thereby causing rotational motion. In the outer-diameter portion of the rotor magnet 106 other than the inner-diameter portion and in the height direction, the magnetic circuit is open, and the Hall device 113 for switching excitation of the motor is placed in the open magnetic circuit. A controller 115 is connected to a harness (not illustrated) through a connector to receive electric power from the main body, start or stop the motor, and input or output control signals indicating the speed of rotation.

Each of the polygon mirrors 103, 104 has four deflection reflection surfaces, and the polygon mirrors 103, 104 are laminated (stacked) in the direction of the rotation axis of the rotary member 101. The polygon mirror 103 and the polygon mirror 104 are relatively rotated (offset) by 45° in the rotation direction of the rotary member 101, thus, the deflection reflection surfaces of the polygon mirror 103 are inclined relative to the deflection reflection surfaces of the polygon mirror 104, in other words, the deflection reflection surfaces of the polygon mirror 103 are offset relative to the deflection reflection surfaces of the polygon mirror 104, and one of the deflection reflection surfaces of the polygon mirror 103 and the corresponding one of the deflection reflection surfaces of the polygon mirror 104 form an angle of 45° in the horizontal plane in FIG. 1 and FIG. 2, which horizontal plane is perpendicular to the rotation axis of the rotary member 101.

The polygon mirrors 103, 104 are fixed to the outer surface of the bearing shaft 102 by shrinkage fit, and thereby the polygon mirrors 103, 104 are integrated together.

A portion of the bottom of the polygon mirror 104, which interferes with the top of the bearing housing 108, is removed, and thereby a cup-shaped portion is formed at the bottom of the polygon mirror 104. Fixtures are used when fixing the polygon mirrors 103, 104 to the outer surface of the bearing shaft 102 by shrinkage fit, while ensuring that the polygon mirror 103 and the polygon mirror 104 are relatively rotated by 45°.

Effective deflection areas 103b of the deflection reflection surfaces of the polygon mirror 103 and effective light deflection areas 104b of the deflection reflection surfaces of the polygon mirror 104 are not at centers of the deflection reflection surfaces of the polygon mirror 103 and the polygon mirror 104 in the direction of the rotation axis of the rotary member 101 (the vertical direction in FIG. 1 and FIG. 2). Specifically, in the polygon mirror 103, which is at an upper position relative to the polygon mirror 104 in the direction of the rotation axis, the effective deflection areas 103b of the polygon mirror 103 are formed near upper sides of the deflection reflection surfaces of the polygon mirror 103; whereas in the polygon mirror 104, which is at a lower position in the direction of the rotation axis, the effective deflection areas 104b of the polygon mirror 104 are formed near lower sides of the deflection reflection surfaces of the polygon mirror 104.

In other words, the effective deflection areas 103b of the polygon mirror 103 are positioned away from the centers of the deflection reflection surfaces of the polygon mirror 103, and the effective deflection areas 104b of the polygon mirror 104 are positioned away from the centers of the deflection reflection surfaces of the polygon mirror 104.

Figure 3:
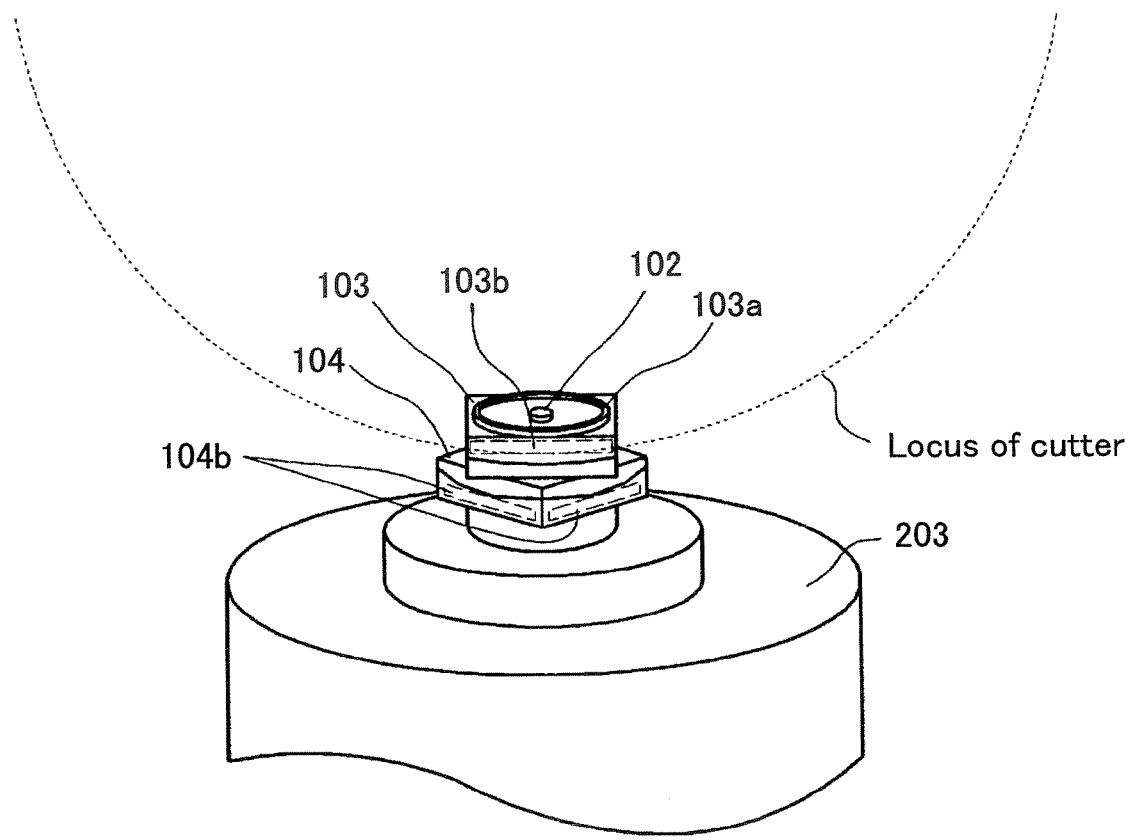
FIG. 3 is a perspective view for illustrating a method of machining the deflection reflection surfaces of the polygon mirrors 103, 104 to be mirror surfaces according to the first embodiment of the present invention.

FIG. 3 is a perspective view for illustrating a method of machining the deflection reflection surfaces of the polygon mirrors 103, 104 to be mirror surfaces according to the first embodiment of the present invention.

Figure 4:
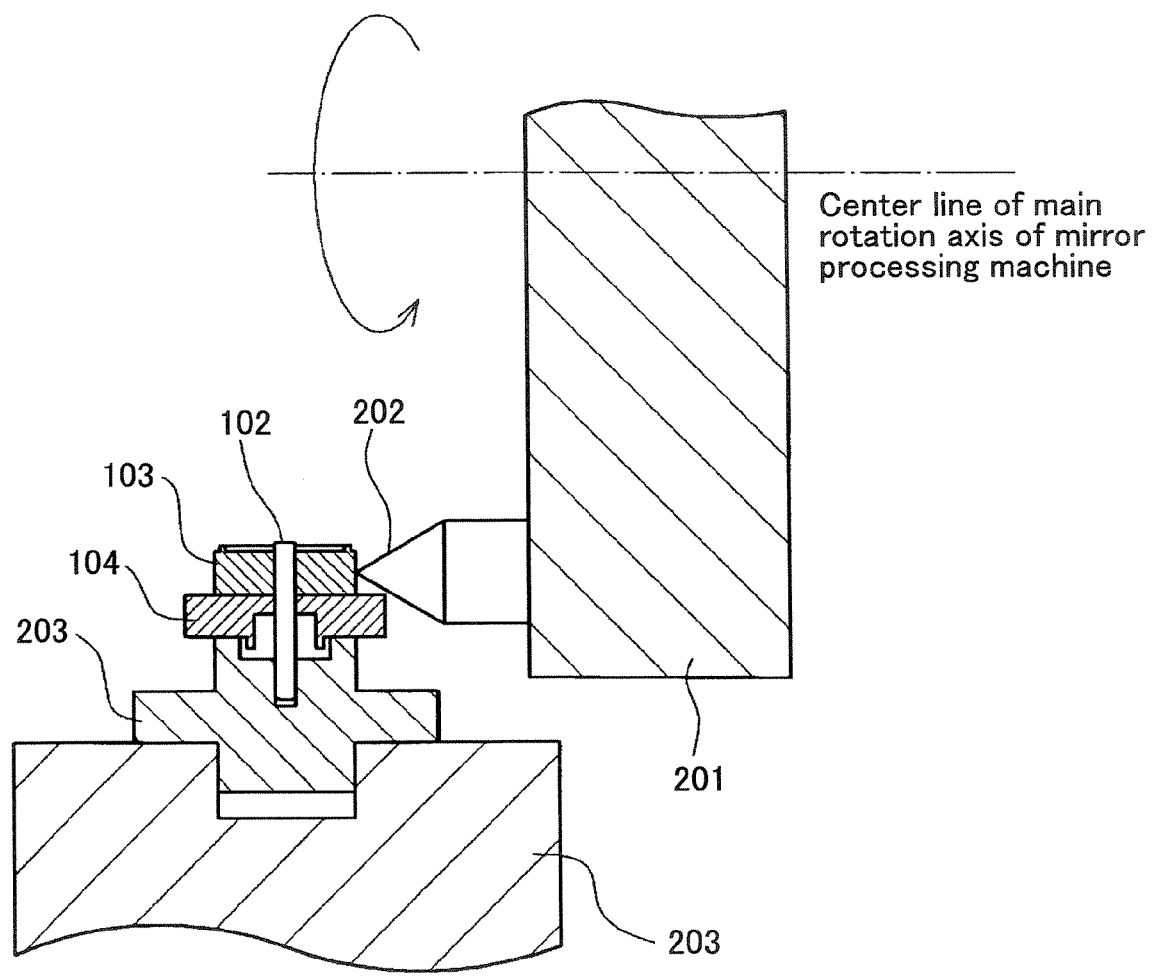
FIG. 4 is a cross-sectional view illustrating the method of machining the deflection reflection surfaces of the polygon mirrors 103, 104 to be mirror surfaces according to the first embodiment of the present invention.

FIG. 4 is a cross-sectional view illustrating the method of machining the deflection reflection surfaces of the polygon mirrors 103, 104 to be mirror surfaces according to the first embodiment of the present invention.

In FIG. 3 and FIG. 4, a core portion of a mirror processing machine is schematically illustrated.

As shown in FIG. 3 and FIG. 4, a disk shape member 201 is fixed to a principal rotation axis of a mirror processing machine, and a cutter 202 is attached to the surface near the outer end of the disk-like material 201. The mirror processing machine is rotated relative to its principal rotation axis, and the cutter 202 moves in the longitudinal direction of the deflection reflection surface, and hence grinds the deflection reflection surfaces to mirror surfaces.

In this process, as shown in FIG. 3 and FIG. 4, corners of the deflection reflection surfaces of the polygon mirrors 103, 104 interfere with the cutter 202 of the mirror processing machine, and machining work cannot be performed near the interface between the laminated polygon mirrors 103, 104. As a result, the effective deflection areas 103b, 104b of the polygon mirrors 103, 104 are formed away from the centers of the deflection reflection surfaces of the polygon mirrors 103, 104. Specifically, when machining the polygon mirror 103, which is at an upper position in the direction of the rotation axis, in order to avoid interference of the corners of the polygon mirror 104, which is at a lower position in the direction of the rotation axis, the cutter 202 of the mirror processing machine grinds the upper area of each of the deflection reflection surfaces of the polygon mirror 103. Thus, the effective deflection areas 103b of the polygon mirror 103 are formed near the upper sides of the deflection reflection surfaces of the polygon mirror 103. On the other hand, when machining the polygon mirror 104, which is at a lower position in the direction of the rotation axis, in order to avoid interference of the corners of the polygon mirror 103 at an upper position, the cutter 202 of the mirror processing machine grinds the lower area of each of the deflection reflection surfaces of the polygon mirror 104, and thus, the effective deflection areas 104b of the polygon mirror 104 are formed near the lower sides of the deflection reflection surfaces of the polygon mirror 104.

After the mirror processing is finished, as shown in FIG. 2, the loci of mirror processing are drawn on the deflection reflection surfaces of the polygon mirrors 103, 104, and these loci form arc-shaped boundaries 103c, 104c on the deflection reflection surfaces of the polygon mirrors 103, 104.

In the above mirror processing process, the polygon mirrors 103, 104 are fixed on the mirror processing machine by a polygon mirror fixture device 203. The polygon mirror fixture device 203 has an angular positioning mechanism (not illustrated), the polygon mirrors 103, 104, which are integrated with the bearing shaft 102, are fixed, and the deflection reflection surfaces are processed one by one. Specifically, after processing of one deflection reflection surface is finished, the angular positioning mechanism of the polygon mirror fixture device 203 rotates the integrated structure of the polygon mirrors 103, 104 by a certain angle, and processing of the next deflection reflection surface is started. For example, when each of the polygon mirrors 103, 104 has four deflection reflection surfaces, the integrated structure of the polygon mirrors 103, 104 may be rotated by 45° each time to alternately grind one deflection reflection surface at the upper position (that is, the deflection reflection surface of the polygon mirror 103), and one deflection reflection surface at the lower position (that is, the deflection reflection surface of the polygon mirror 104). Alternatively, the integrated structure of the polygon mirrors 103, 104 may be rotated by 90° each time to first grind the four deflection reflection surfaces at the upper position successively (that is, the four deflection reflection surfaces of the polygon mirror 103), and then grind the four deflection reflection surfaces at the lower position successively (that is, the four deflection reflection surfaces of the polygon mirror 104). For example, the angular positioning mechanism of the polygon mirror fixture device 203 has an angular positioning precision as high as 1/60° (1'). Because of such a high angular positioning precision, the deflection reflection surfaces of the polygon mirrors 103, 104 can be processed and orientated highly precisely.

As described above, in the optical deflector of the present embodiment, each of the polygon mirrors 103, 104 has four deflection reflection surfaces, and the polygon mirrors 103, 104 are laminated in the direction of the rotation axis of the rotary member 101; the polygon mirror 103 and the polygon mirror 104 are relatively rotated by 45° in the rotation direction of the rotary member 101, that is, the deflection reflection surfaces of the polygon mirror 103 and the deflection reflection surfaces of the polygon mirror 104 form an angle of 45° in a horizontal plane; the polygon mirrors 103, 104 are fixed to the outer surface of the bearing shaft 102 by shrinkage fit, and thus the polygon mirrors 103, 104 are integrated together.

Therefore, the laminated polygon mirrors 103, 104 are arranged precisely in the vertical direction such that they are relatively rotated by a predetermined angle in the rotation direction of the rotary member 101. Due to this, even when a thermal stress is imposed, or during acceleration or de-acceleration operations for starting or stopping, the polygon mirrors 103, 104 can hardly shift from their original positions to cause unbalance of the rotary member 101 and produce large rotational vibration.

In addition, since it is not necessary to allocate the effective deflection areas 103b of the deflection reflection surfaces of the polygon mirror 103 and the effective light deflection areas 104b of the deflection reflection surfaces of the polygon mirror 104 at the centers of the deflection reflection surfaces of the polygon mirror 103 and the polygon mirror 104 in the direction of the rotation axis of the rotary member 101, the corners of the deflection reflection surfaces of the polygon mirrors 103, 104 do not interfere with the cutter 202 of the mirror processing machine; thus, it is possible to process the deflection reflection surfaces with the polygon mirrors 103, 104 integrated together.

In addition, since each of the polygon mirrors 103, 104 has a simple shape, before processing the deflection reflection surfaces with the mirror processing machine, the deflection reflection surfaces can be machined to have nearly the same shape of the polygon mirror 103 or 104, thus forming the deflection reflection surfaces. This is referred to as "blank machining". In this way, the polygon mirrors 103, 104 can be fabricated easily at low cost by the blank machining.

In the present embodiment, the polygon mirror 103 or 104 has four deflection reflection surfaces, but the present embodiment is not limited to this. For example, two polygon mirrors each having six deflection reflection surfaces may be laminated in the direction of the rotation axis of the rotary member 101 (vertical direction), the two laminated polygon mirrors may be relatively rotated by 30° in the rotation direction of the rotary member 101 (a horizontal plane), and be fixed to the outer surface of the bearing shaft 102 by shrinkage fit to integrate the two polygon mirrors.

Second Embodiment

Figure 5:
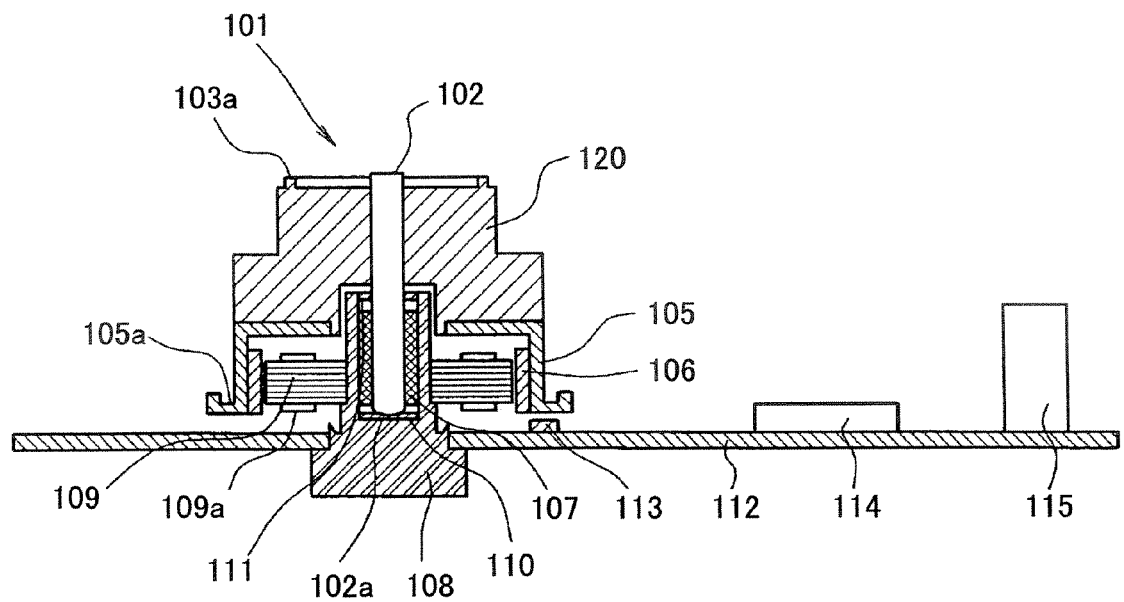
FIG. 5 is a cross-sectional view of an optical deflector including a rotary member according to a second embodiment of the present invention.

FIG. 5 is a cross-sectional view of an optical deflector including a rotary member according to a second embodiment of the present invention.

Figure 6:
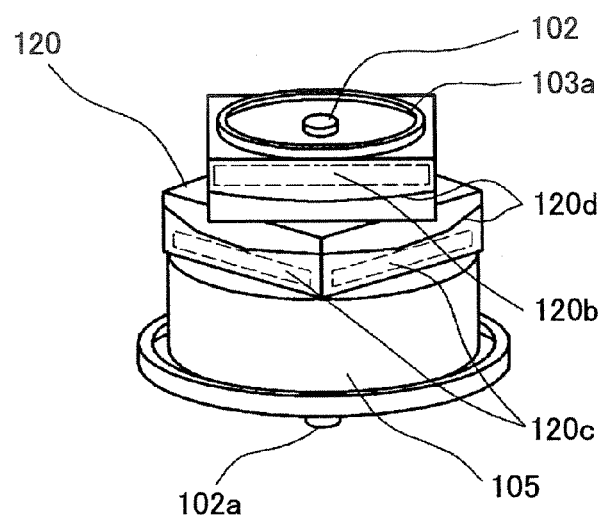
FIG. 6 is a perspective view of the optical deflector according to the second embodiment of the present invention.

FIG. 6 is a perspective view of the optical deflector according to the second embodiment of the present invention.

In this embodiment, the same reference numbers are assigned to the same elements as illustrated in the previous embodiment, and overlapping descriptions are omitted.

As shown in FIG. 5 and FIG. 6, a rotary member 101 of the optical deflector of the present embodiment includes a polygon mirror unit 120, which is formed from a single element. The rotary member of the present embodiment differs from the rotary member of the previous embodiment only in the polygon mirror unit 120, and the rest of the configuration of the rotary member of the present embodiment is the same as the rotary member of the previous embodiment.

The polygon mirror unit 120 includes two polygon mirrors, each of which has four deflection reflection surfaces, which two polygon mirrors are laminated in the direction of the rotation axis of the rotary member 101. In addition, the two polygon mirrors are relatively rotated by 45° in the rotation direction of the rotary member 101 so that the deflection reflection surfaces of the upper polygon mirror are offset (inclined) relative to the deflection reflection surfaces of the lower polygon mirror by 45°, in other words, one of the deflection reflection surfaces of the upper polygon mirror and the corresponding one of the deflection reflection surfaces of the lower polygon mirror form an angle of 45° in the horizontal plane in FIG. 5 and FIG. 6, which plane is perpendicular to the rotation axis of the rotary member 101.

The polygon mirror unit 120 is fixed to the bearing shaft 102 by shrinkage fit; thereby the polygon mirror unit 120 and the bearing shaft 102 are integrated together.

Effective deflection areas 120b, 120c of the deflection reflection surfaces of the polygon mirror unit 120 are formed away from centers of the deflection reflection surfaces of the polygon mirror unit 120 in the direction of the rotation axis of the rotary member 101 (the vertical direction in FIG. 5 and FIG. 6). Specifically, in the upper polygon mirror, the effective deflection areas 120b are formed near upper sides of the deflection reflection surfaces of the upper polygon mirror, and in the lower polygon mirror, the effective deflection areas 120c are formed near lower sides of the deflection reflection surfaces of the lower polygon mirror.

The deflection reflection surfaces of the polygon mirror unit 120 are machined to mirror surfaces in the same way as that in the previous embodiment. As shown in FIG. 6, after the mirror processing is finished, the loci of mirror processing are drawn on the deflection reflection surfaces of the polygon mirrors of the polygon mirror unit 120, and these loci form arc-shaped boundaries 120d on the deflection reflection surfaces of the polygon mirror unit 120.

According to the present embodiment, the upper polygon mirror and the lower polygon mirror are integral to be a single part. Due to this, the number of parts is reduced, and during the shrinkage fit, it is not necessary to use the fixture to set the relative rotation angle between the upper polygon mirror and the lower polygon mirror, and it is easy to assemble the rotary member.

Since the upper polygon mirror and the lower polygon mirror are integrated to be a single part, the shape of the polygon mirror unit becomes somewhat complicated. However, by forming the polygon mirror unit 120 by forging, it is possible to form the polygon mirror unit 120, which has a complicated shape, at low cost compared to the method of grinding a raw material to cut off a polygon mirror object.

Third Embodiment

Figure 7:
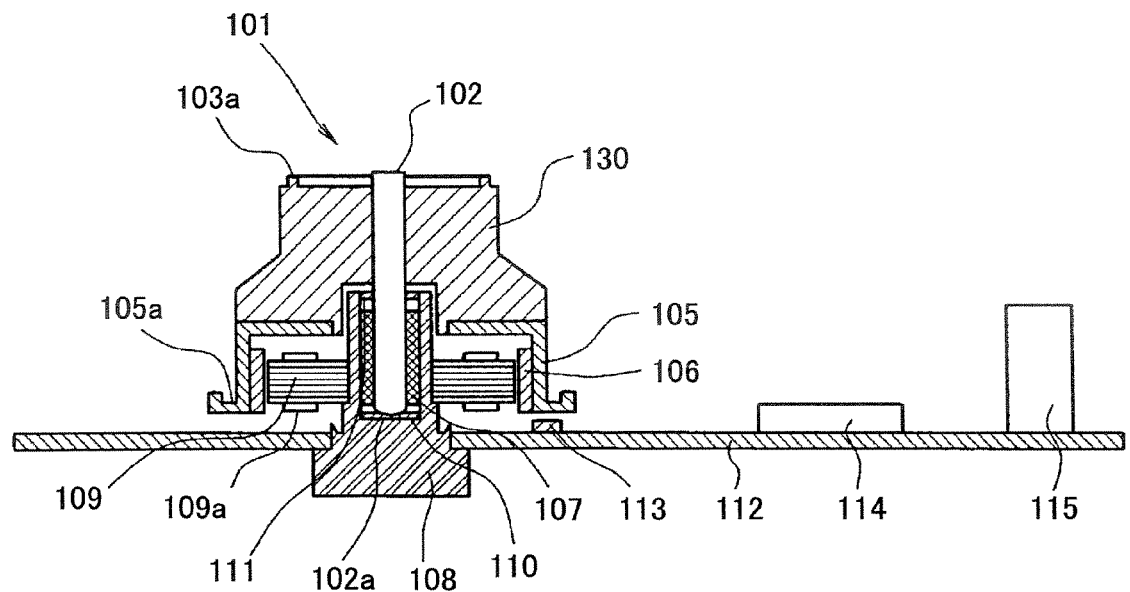
FIG. 7 is a cross-sectional view of an optical deflector including a rotary member according to a third embodiment of the present invention.

FIG. 7 is a cross-sectional view of an optical deflector including a rotary member according to a third embodiment of the present invention.

Figure 8:
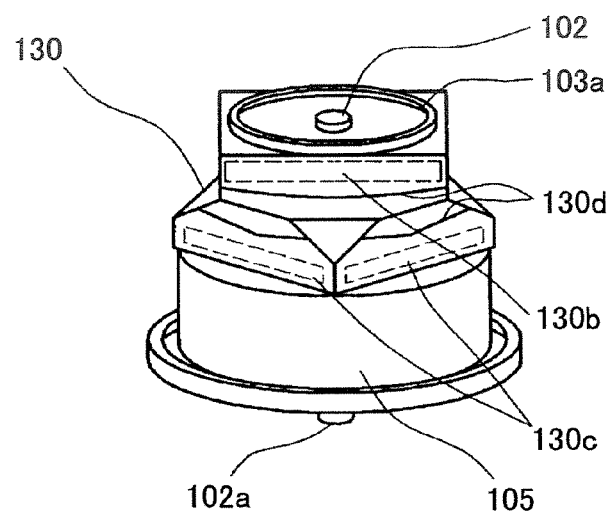
FIG. 8 is a perspective view of the optical deflector according to the third embodiment of the present invention.

FIG. 8 is a perspective view of the optical deflector according to the third embodiment of the present invention.

In this embodiment, the same reference numbers are assigned to the same elements as illustrated in the previous embodiment, and overlapping descriptions are omitted.

As shown in FIG. 7 and FIG. 8, a rotary member 101 of the optical deflector of the present embodiment includes a polygon mirror unit 130. The rotary member of the present embodiment differs from the rotary member of the previous embodiments only in the polygon mirror unit 130, and the rest of the configuration of the rotary member of the present embodiment is the same as the rotary member of the previous embodiments.

In the polygon mirror unit 130 of the present embodiment, corners of deflection reflection surfaces of the lower polygon mirror and corners of deflection reflection surfaces of the upper polygon mirror, which corners are on an interface of the lower polygon mirror and the upper polygon mirror, are cut off.

The cut-off corners are those corners which interfere with the cutter of the mirror processing machine when machining the deflection reflection surfaces to mirror surfaces. In the present embodiment, because those corners interfering with the cutter of the mirror processing machine are cut off, the cutter of the mirror processing machine can be moved near the interface between the laminated upper polygon mirror and lower polygon mirror for machining. As a result, the effective deflection areas 130b, 130c of the polygon mirror unit 130 can be made broad compared to those in the previous embodiments. Therefore, it is not necessary to separate the deflection reflection surfaces of the lower polygon mirror and the deflection reflection surfaces of the upper polygon mirror away from each other in the rotation axis direction, but the lower polygon mirror and the upper polygon mirror can be closer to each other. Thus, it is possible to reduce the size of the polygon mirror unit 130 in the rotation axis direction. Furthermore, if the surfaces, which are formed when cutting off the corners of the deflection reflection surfaces, are plane surfaces, the polygon mirror unit 130 can be fabricated easily at low cost by blank machining.

Figure 9:
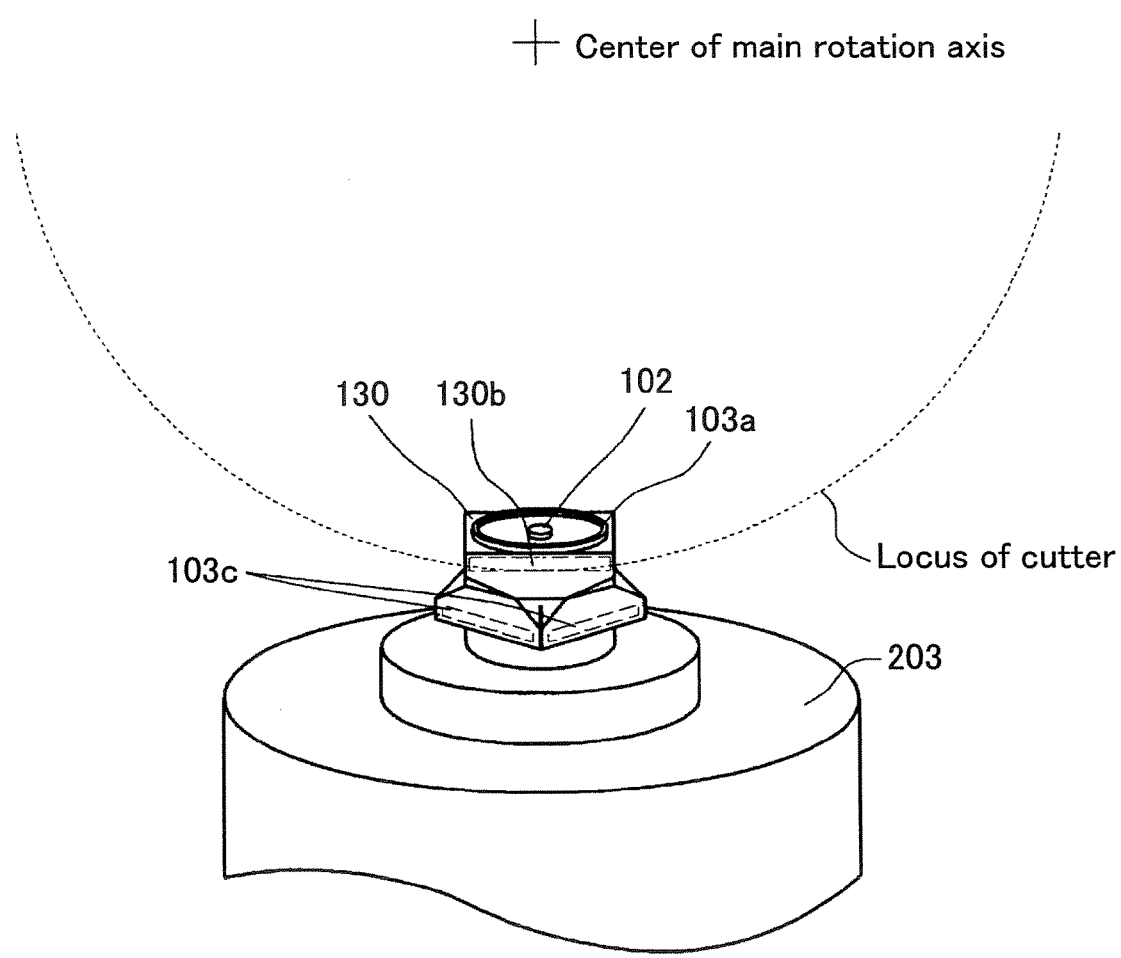
FIG. 9 is a perspective view for illustrating a method of machining the deflection reflection surfaces of the polygon mirror unit 130 to be mirror surfaces according to the third embodiment of the present invention.

FIG. 9 is a perspective view for illustrating a method of machining the deflection reflection surfaces of the polygon mirror unit 130 to be mirror surfaces according to the third embodiment of the present invention.

Figure 10:
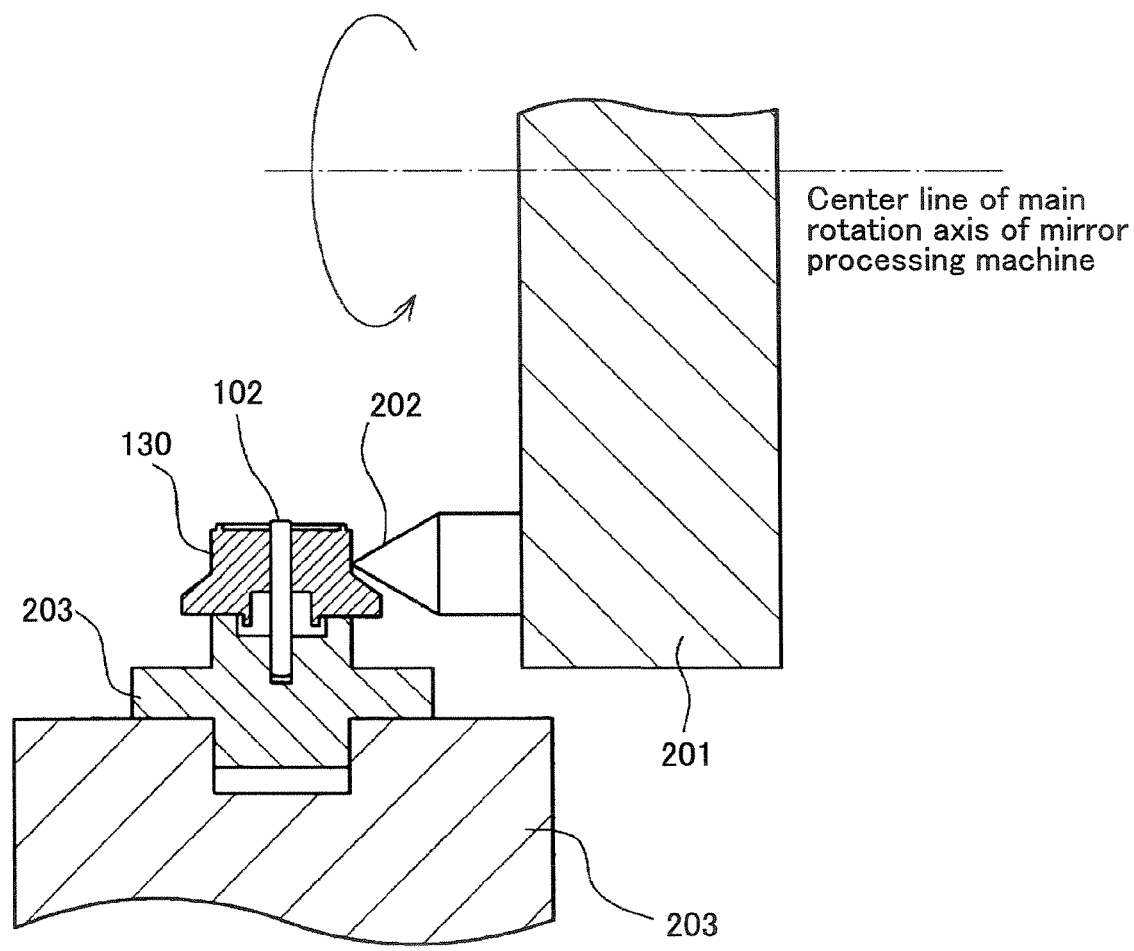
FIG. 10 is a cross-sectional view illustrating the method of machining the deflection reflection surfaces of the polygon mirror unit 130 to be mirror surfaces according to the third embodiment of the present invention.

FIG. 10 is a cross-sectional view illustrating the method of machining the deflection reflection surfaces of the polygon mirror unit 130 to be mirror surfaces according to the third embodiment of the present invention.

The deflection reflection surfaces of the polygon mirror unit 130 are machined to mirror surfaces in the same way as that in the previous embodiments. As shown in FIG. 7 and FIG. 9, after the mirror processing is finished, the loci of mirror processing are drawn on the deflection reflection surfaces of the polygon mirrors of the polygon mirror unit 130, and these loci form arc-shaped boundaries 130d on the deflection reflection surfaces of the polygon mirror unit 130. Further, in the present embodiment, the arc-shaped boundaries 130d are positioned closer to the interface between the laminated upper polygon mirror and the lower polygon mirror than in the previous embodiments.

Similar to the second embodiment, by forming the polygon mirror unit 130 by forging, it is possible to reduce the cost compared to the method of grinding a raw material to cut off a polygon mirror object.

Fourth Embodiment

Next, configurations and operations of an optical scanning device having an optical deflector as described in the first through third embodiments are described.

Figure 11:
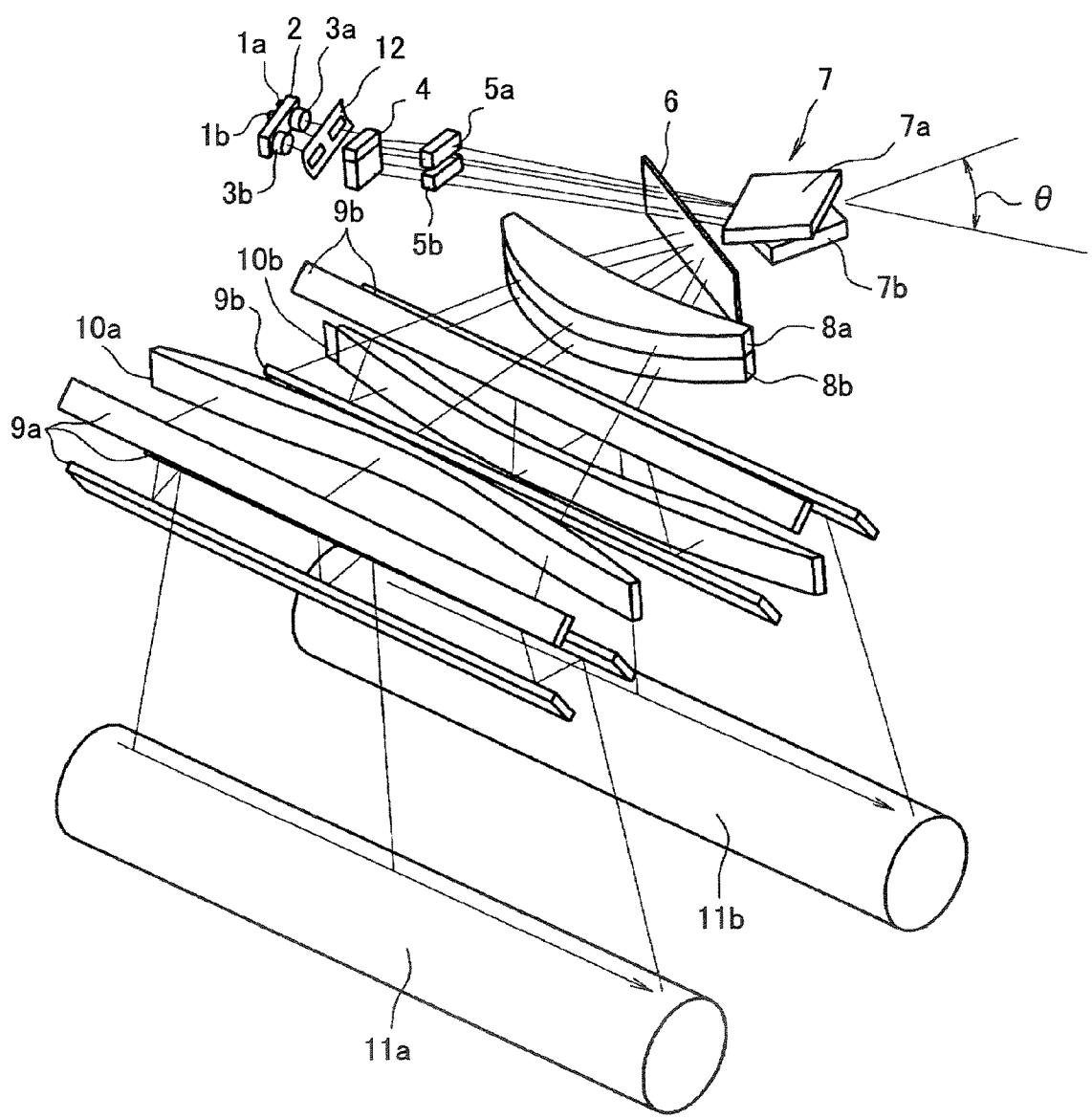
FIG. 11 is a schematic perspective view illustrating a configuration of an optical scanning device according to a fourth embodiment of the present invention.

FIG. 11 is a schematic perspective view illustrating a configuration of an optical scanning device according to a fourth embodiment of the present invention.

As shown in FIG. 11, there are two semiconductor lasers 1a and 1b, each of which emits a light beam, which two semiconductor lasers constitute a light source. The semiconductor lasers 1a and 1b are held in a holder 2 and are separated from each other at a certain distance.

Two light beams from the semiconductor lasers 1a and 1b, separately, are converted into beams of appropriate beam configurations (parallel beams, weakly-diverging beams, or weakly-converging beams) by coupling lenses 3 and 3a so as to fit the subsequent optical system. In the present embodiment, it is assumed that the coupling lenses 3 and 3a convert the incident light beams into parallel beams.

The light beams from the coupling lenses 3a and 3b, which have desired beam configurations, pass through an aperture 12, which defines the width of the incident light beam. The shaped light beams are incident on a half-mirror prism 4, and each light beam is divided into two parts in a sub-scan direction by the half-mirror prism 4.

Figure 12:
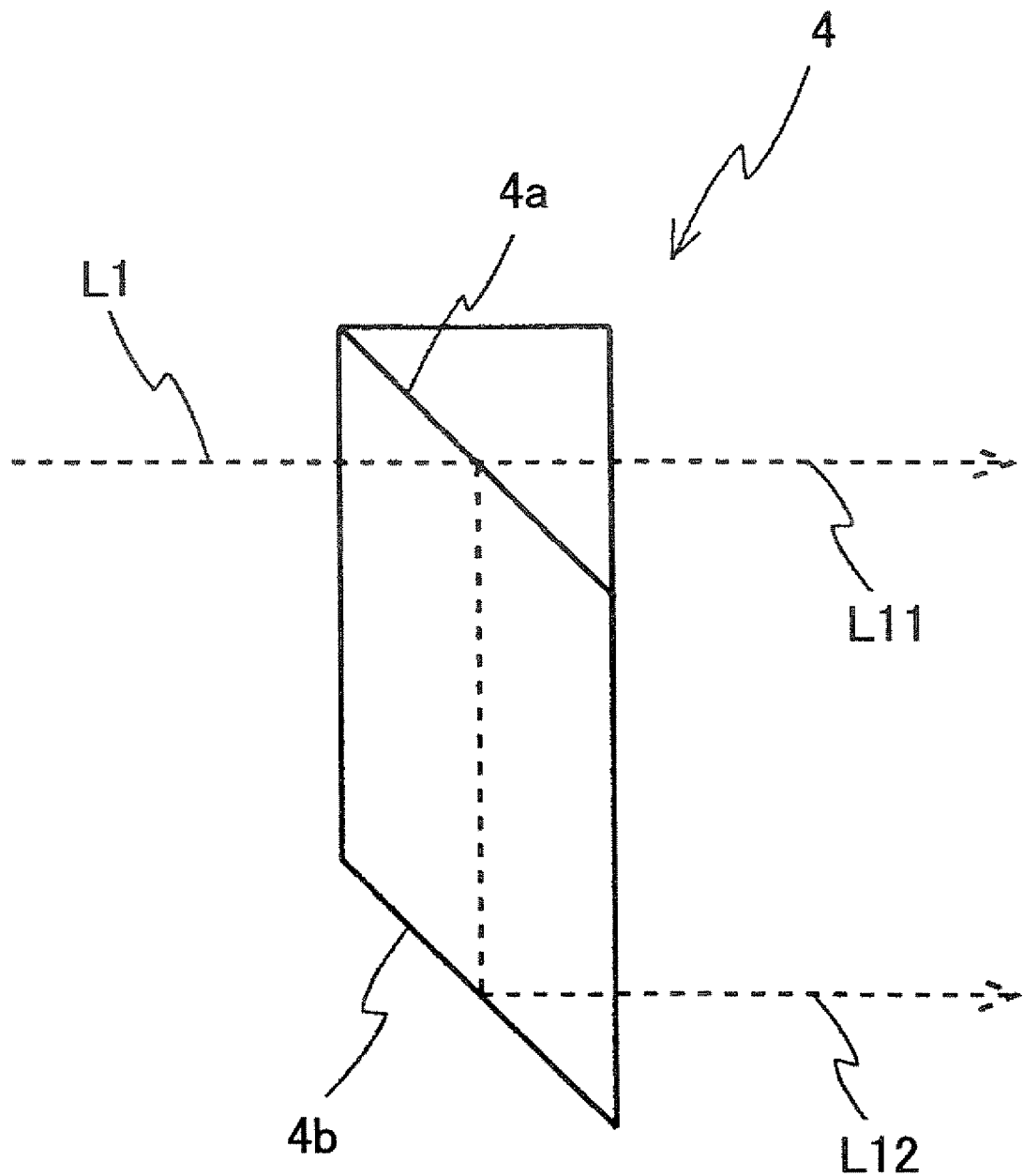
FIG. 12 is a schematic perspective view illustrating functions of the half-mirror prism 4 in the fourth embodiment of the present invention.

FIG. 12 is a schematic perspective view illustrating functions of the half-mirror prism 4 in the fourth embodiment of the present invention.

As shown in FIG. 12, the half-mirror prism 4 divides an incident light beam into two parts in a sub-scan direction. Specifically, a light beam L1 emitted from the semiconductor laser 1a is divided into two parts in the sub-scan direction, producing a light beam L11 and a light beam L12. Similarly, although not illustrated, a light beam L2 emitted from the semiconductor laser 1b is also divided into two parts in the sub-scan direction, producing a light beam L21 and a light beam L22.

In FIG. 12, the vertical direction is the sub-scan direction; the half-mirror prism 4 has a semi-transparent mirror 4a and a reflection surface 4b, which are arranged in parallel in the sub-scan direction. When the light beam L1 is incident on the half-mirror prism 4, the light beam L1 propagates to the semi-transparent mirror 4a, where a portion of the light beam L1 transmits straightforward through the semi-transparent mirror 4a and turns into the light beam L11; the remaining portion of the light beam L1 is reflected on the semi-transparent mirror 4a, is directed to the reflection surface 4b, and is totally reflected on the reflection surface 4b, turning into the light beam L12.

In this example, since the semi-transparent mirror 4a and the reflection surface 4b are arranged in parallel, the light beam L11 and the light beam L12 emitted from the half-mirror prism 4 are parallel to each other.

In this way, the light beam L1 emitted from the semiconductor laser 1a is divided into the light beam L11 and the light beam L12 in the sub-scan direction. Similarly, the light beam emitted from the semiconductor laser 1b is also divided into two light beams in the sub-scan direction.

Namely, in this example, one light source (number of light source m=1) emits two light beams, and the half-mirror prism 4 divides each of the two light beams into two parts (number of divisions q=2) in the sub-scan direction, obtaining four light beams.

Returning to FIG. 11, the four light beams emitted from the half-mirror prism 4 are incident into cylindrical lenses 5a and 5b; the cylindrical lenses 5a and 5b condense the light beams in the sub-scan direction, and form long line-shaped images in the main scan direction near deflection reflection surfaces of a polygon mirror deflector 7.

Among the light beams emitted from the semiconductor lasers 1a, 1b and divided by the half-mirror prism 4, the light beam transmitting straightforward though the semi-transparent mirror 4a of the half-mirror prism 4, which light beam is indicated as "light beam L11" in FIG. 12, enters into the cylindrical lens 5a, and the light beam reflected on the semi-transparent mirror 4a and further reflected on the reflection surface 4b, which light beam is indicated as "light beam L12" in FIG. 12, enters into the cylindrical lens 5b.

As shown in FIG. 11, a soundproof glass 6 is provided on a window of a soundproof housing of the polygon mirror deflector 7. The four light beams emitted from the semiconductor lasers 1a, 1b enter the polygon mirror deflector 7 via the soundproof glass 6, and the incident light beams are deflected by the polygon mirror deflector 7 and are emitted to the side of a scanning-imaging optical system through the soundproof glass 6.

As shown in FIG. 11, the polygon mirror deflector 7 includes an upper polygon mirror 7a and a lower polygon mirror 7b, which are laminated in the direction of the rotation axis of the polygon mirror deflector 7 and are integrated together. The polygon mirror deflector 7 is driven by a driving motor to rotate with respect to its rotation axis.

In the present embodiment, the upper polygon mirror 7a and the lower polygon mirror 7b have the same shape, and each of the upper polygon mirror 7a and the lower polygon mirror 7b has four deflection reflection surfaces. In addition, the deflection reflection surfaces of the upper polygon mirror 7a are inclined relative to the deflection reflection surfaces of the lower polygon mirror 7b by 45° in the rotation direction. In other words, the upper polygon mirror 7a and the lower polygon mirror 7b are relatively rotated by 45° in a rotation plane perpendicular to the rotation axis.

As shown in FIG. 11, there are provided first lenses 8a and 8b, light-path bending mirrors 9a and 9b, second lenses 10a and 10b, and photoconductors 11a and 11b.

The first lens 8a, the light-path bending mirror 9a, and the second lens 10a constitute a first scanning-imaging optical system. The first scanning-imaging optical system directs the two light beams, which are emitted from the semiconductor lasers 1a, 1b, transmit though the semi-transparent mirror 4a of the half-mirror prism 4, and are deflected by the upper polygon mirror 7a of the polygon mirror deflector 7, to the photoconductor 11a on which optical scanning of these light beams is performed; as a result, two light spots of the two light beams divided in the sub scan direction are formed on the photoconductor 11a.

Similarly, the first lens 8b, the light-path bending mirror 9b, and the second lens 10b constitute a second scanning-imaging optical system. The second scanning-imaging optical system directs the two light beams, which are emitted from the semiconductor lasers 1a, 1b, reflected on the semi-transparent mirror 4a of the half-mirror prism 4, and deflected by the lower polygon mirror 7b of the polygon mirror deflector 7, to the photoconductor 11b on which optical scanning of these light beams is performed. As a result, two light spots of the two light beams divided in the sub scan direction are formed on the photoconductor 11b.

Optical elements described above are arranged so that when viewed in the direction of the rotation axis of the polygon mirror deflector 7, principal rays of the light beams emitted from the semiconductor lasers 1a, 1b intersect near the deflection reflection surface. Hence, the pair of the two light beams incident on the deflection reflection surface form an opening angle, which is defined to be an angle, when viewed from the deflection reflection surface side to the light source side, subtended by projections of the two light beams on a plane perpendicular to the rotation axis.

Because of the opening angle, the light spots respectively formed on the photoconductors 11a and 11b are separated in the main scan direction, and for this reason, it is possible to separately detect each of the four light beams, which respectively scan the photoconductors 11a and 11b, and acquire a synchronization signal indicating start of the optical scanning for each of the light beams.

In this way, the two light beams deflected by the upper polygon mirror 7a of the polygon mirror deflector 7 scan the photoconductor 11a (namely, multi-beam scanning), and the two light beams deflected by the lower polygon mirror 7b of the polygon mirror deflector 7 scan the photoconductor 11b (this is also multi-beam scanning).

Since the deflection reflection surfaces of the upper polygon mirror 7a are inclined relative to the deflection reflection surfaces of the lower polygon mirror 7b by 45° in the rotation direction, which is perpendicular to the direction of the rotation axis of the polygon mirror deflector 7, when the upper polygon mirror 7a deflects the incident light beams to scan the photoconductor 11a, the light beams incident on the lower polygon mirror 7b are not directed to the photoconductor 11b; whereas, when the lower polygon mirror 7b deflects the incident light beams to scan the photoconductor 11b, the light beams incident on the upper polygon mirror 7a are not directed to the photoconductor 11a.

In other words, optical scanning of the upper polygon mirror 7a and optical scanning of the lower polygon mirror 7b are carried out alternately in time.

Figure 13A:
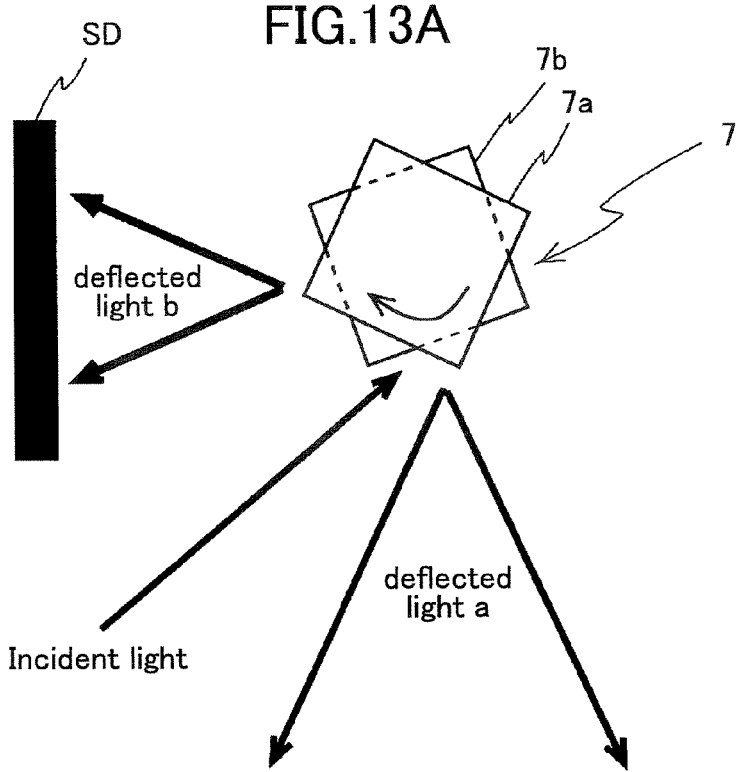
FIG. 13A and FIG. 13B are schematic views illustrating functions of the polygon mirror deflector 7.
Figure 13B:
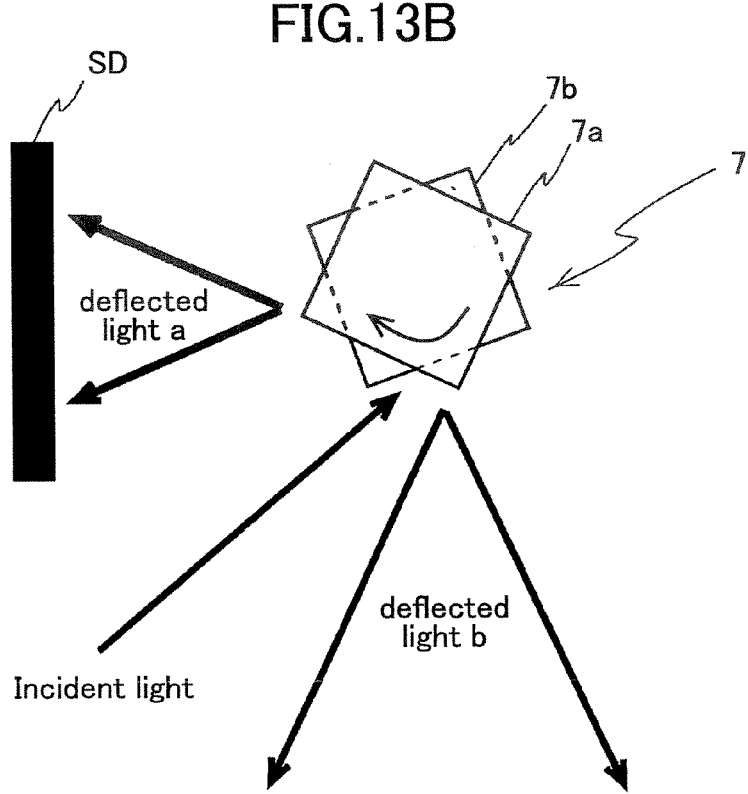

FIG. 13A and FIG. 13B are schematic views illustrating functions of the polygon mirror deflector 7.

In FIG. 13A and FIG. 13B, the light beam incident on the polygon mirror deflector 7 is indicated to be an "incident light beam" (actually, there are four incident light beams), and the light beams deflected by the polygon mirror deflector 7 are indicated to be "deflected light beam a and deflected light beam b".

In FIG. 13A, the incident light beam is incident to the polygon mirror deflector 7, and is reflected and deflected by the upper polygon mirror 7a, generating the deflected light beam a. The deflected light beam a is directed to the scanning position, namely, the photoconductor 11a. During this process, the deflected light beam b, which is generated by the lower polygon mirror 7b, is not emitted to the scanning position, namely, the photoconductor 11b.

In FIG. 13B, the deflected light beam b generated by the lower polygon mirror 7b is directed to the scanning position, namely, the photoconductors 11b, whereas, the deflected light beam a, which is generated by the upper polygon mirror 7a, is not emitted to the scanning position, namely, the photoconductor 11a.

When the deflected light beam produced by one of the upper polygon mirror 7a and the lower polygon mirror 7b is scanning the corresponding one of the photoconductor 11a and the photoconductor 11b, in order that the deflected light beam produced by the other one polygon mirror does not become "ghost light", as shown in FIG. 13A and FIG. 13B, a light shield SD may be provided to shield the deflected light beam so that the deflected light beam is not directed to the scanning position. The light shield SD can be implemented easily by making the inner wall of the above-mentioned soundproof housing irreflexive.

As described above, the multi-beam scanning of the upper polygon mirror 7a and the multi-beam scanning of the lower polygon mirror 7b are carried out alternately, for example, during the multi-beam scanning of the photoconductor 11a; the light intensity of the light source is modulated to correspond to black image signals; and during the multi-beam scanning of the photoconductor 11b, the light intensity of the light source is modulated to correspond to magenta image signals. Thereby, a black latent image is written on the photoconductor 11a, and a magenta latent image is written on the photoconductor 11b.

Figure 14:
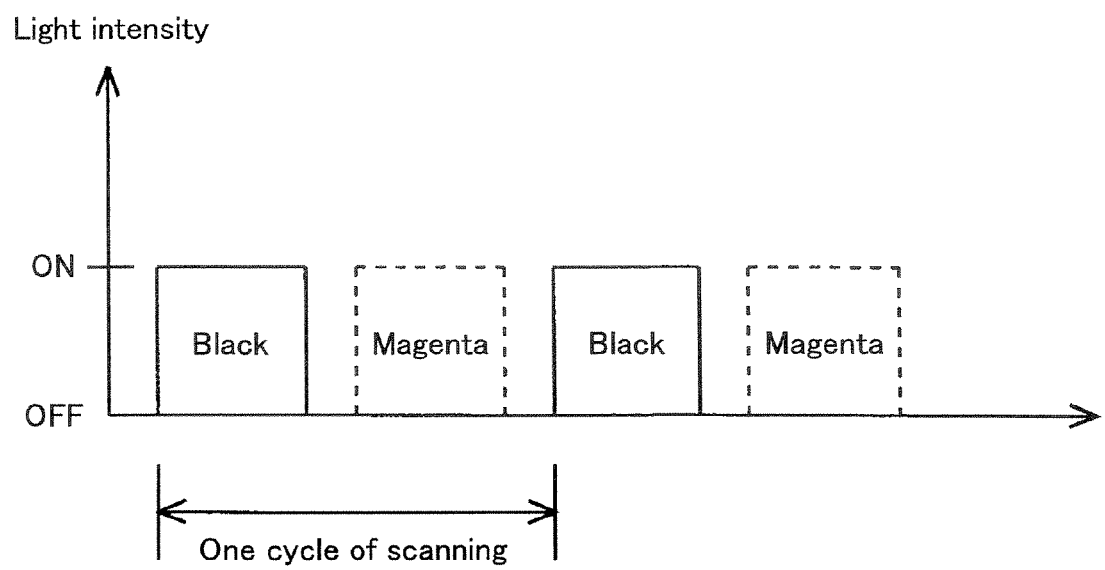
FIG. 14 is a diagram illustrating modulation of the light intensity of the light source when writing a black image and a magenta image.

FIG. 14 is a diagram illustrating modulation of the light intensity of the light source when writing a black image and a magenta image.

Specifically, FIG. 14 shows a time chart when the same semiconductor lasers 1a, 1b are used for writing a black image and a magenta image and when the entire effective scanning area is irradiated with light.

In FIG. 14, the solid line waveforms are for writing a black image, and the dashed line waveforms are for writing a magenta image. As described above, a synchronization light-receiving unit (for example, a not-illustrated photo diode) is provided outside the entire effective scanning area to detect the light beam going to the optical scanning starting position, and the timing of writing a black image and the timing of writing a magenta image is determined from the detection results.

According to the optical scanning device of the present embodiment, because the number of parts and amount of materials in the light source are reduced, the environmental impact is lowered, and furthermore, occurrence of trouble in the light source can be effectively prevented.

Fifth Embodiment

Figure 15:
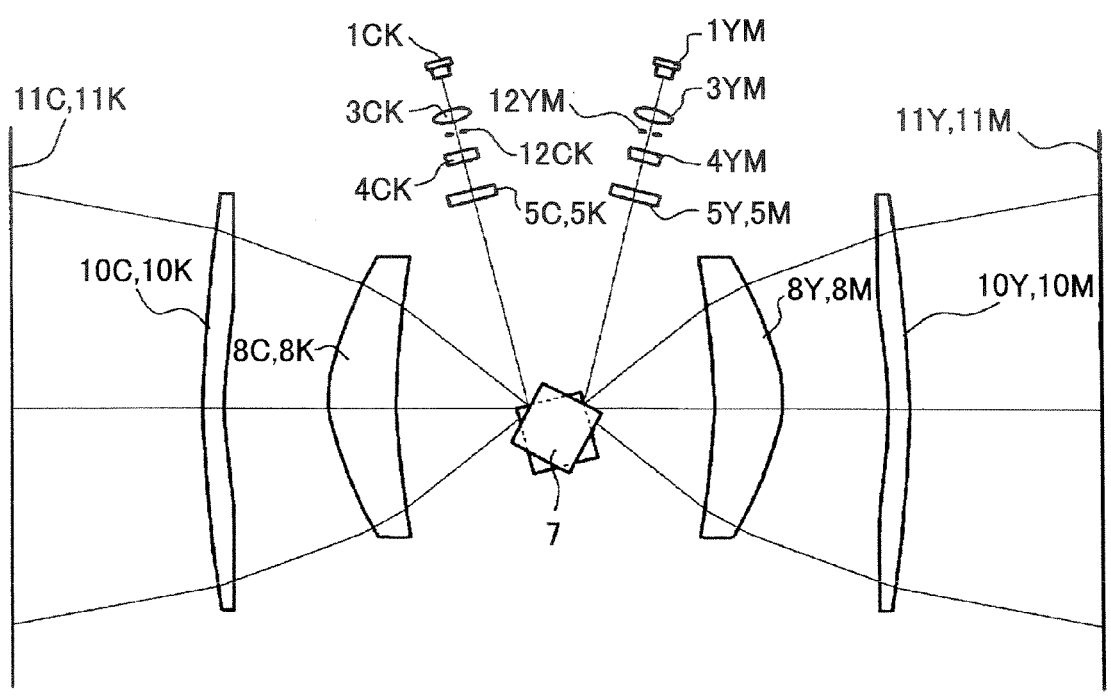
FIG. 15 is a schematic view illustrating a configuration of an optical scanning device according to a fifth embodiment of the present invention.

FIG. 15 is a schematic view illustrating a configuration of an optical scanning device according to a fifth embodiment of the present invention.

In FIG. 15, the optical system of the optical scanning device is a plan view in the sub scan direction, that is, in the direction of the rotation axis of the polygon mirror deflector 7. For sake of simplicity, in FIG. 15, illustration of light-path bending mirrors is omitted, and the light paths are drawn as straight lines.

In the optical scanning device of the present embodiment, for example, there are two light sources (number of light sources m=2) and four scanning positions, and optical scanning light paths are formed to lead light beams emitted from two light sources to four scanning positions. The optical scanning light paths to the four scanning positions (number of scanning positions n=4) are selected sequentially, and based on image signals corresponding to one of the scanning positions associated with the selected light path, the intensity of the light beams from the two light sources is modulated. Thus, four scanning positions are scanned with light beams emitted from two light sources.

Alternatively, each of the two light sources (number of light sources m=2) emits only one light beam (number of light beams p=1), each of the two light beams from the two light sources is divided into two parts (number of divisions q=2) in the sub-scan direction, therefore, each of the four scanning positions is scanned by one light beam.

In addition, four photoconductors 11Y, 11M, 11C, and 11K are provided at the four scanning positions. Electrostatic latent images formed on the four photoconductors 11Y, 11M, 11C, and 11K are separately converted into visible images by magenta, yellow, cyan, and black toner, thereby forming a color image.

As shown in FIG. 15, in the optical scanning device of the present embodiment, there are provided semiconductor lasers 1YM, 1CK, and each of the semiconductor lasers 1YM, 1CK emits one light beam. For example, the semiconductor laser 1YM is intensity-modulated based on image signals corresponding to a yellow image and image signals corresponding to a magenta image alternately; whereas, the semiconductor laser 1CK is intensity-modulated based on image signals corresponding to a cyan image and image signals corresponding to a black image alternately.

The light beam emitted from the semiconductor laser 1YM is converted into a parallel beam by a coupling lens 3YM, the light beam from the coupling lens 3YM passes through an aperture 12YM and is shaped. The shaped light beam is incident on a half-mirror prism 4YM, and is divided into two light beams in the sub scan direction by the half-mirror prism 4YM. Here, the half-mirror prism 4YM is the same as the half-mirror prism 4 as described with reference to FIG. 12; one of the divided light beams is used for writing the yellow image, and the other one of the divided light beams is used for writing the magenta image.

The two light beams divided in the sub scan direction are incident on cylindrical lenses 5Y and 5M, which are arranged to be overlapped in the sub scan direction; the cylindrical lenses 5Y and 5M condense the two light beams in the sub-scan direction, and direct the light beams to the polygon mirror deflector 7. Here, the polygon mirror deflector 7 has the same structure as described with reference to FIG. 11, FIG. 13A and FIG. 13B. Specifically, the polygon mirror deflector 7 includes an upper polygon mirror and a lower polygon mirror, which are laminated in the direction of the rotation axis of the polygon mirror deflector 7 and are integrated together. The polygon mirror deflector 7 is driven by a driving motor to rotate with respect to its rotation axis. The upper polygon mirror and the lower polygon mirror have the same shape, and each of the upper polygon mirror and the lower polygon mirror has four deflection reflection surfaces. In addition, the deflection reflection surfaces of the upper polygon mirror are inclined relative to the deflection reflection surfaces of the lower polygon mirror by a certain angle in the rotation direction, in other words, the upper polygon mirror and the lower polygon mirror are relatively rotated by the certain angle in a rotation plane perpendicular to the rotation axis. The cylindrical lenses 5Y and 5M condense the incident light beams in the sub-scan direction, and form long line-shaped images in the main scan direction near deflection reflection surfaces of the lower polygon mirror and the upper polygon mirror.

The light beam deflected by the polygon mirror deflector 7 transmits through first lenses 8Y and 8M, and second lenses 10Y and 10M, and the first lenses 8Y and 8M and the second lenses 10Y and 10M direct the incident light to form light spots at the scanning positions 11Y and 11M to scan the scanning positions 11Y and 11M.

The light beam emitted from the semiconductor laser 1CK is converted into a parallel beam by a coupling lens 3CK, the light beam from the coupling lens 3CK passes through an aperture 12CK and is shaped. The shaped light beam is incident into a half-mirror prism 4CK, and is divided into two light beams in the sub scan direction by the half-mirror prism 4CK. Here, the half-mirror prism 4CK is the same as the half-mirror prism 4YM, and one of the divided light beams is used for writing the cyan image, and the other one of the divided light beams is used for writing the black image.

The two light beams divided in the sub scan direction are incident on cylindrical lenses 5C and 5K, which are arranged to be overlapped in the sub scan direction; the cylindrical lenses 5C and 5K condense the two light beams in the sub-scan direction, and direct the light beams to the polygon mirror deflector 7.

The light beams deflected by the polygon mirror deflector 7 transmit through first lenses 8C and 8K and second lenses 10C and 10K, and the first lenses 8C and 8K and the second lenses 10Y and 10M direct the incident light to form light spots at the scanning positions 11C and 11K to scan the scanning positions 11C and 11K.

Figure 16:
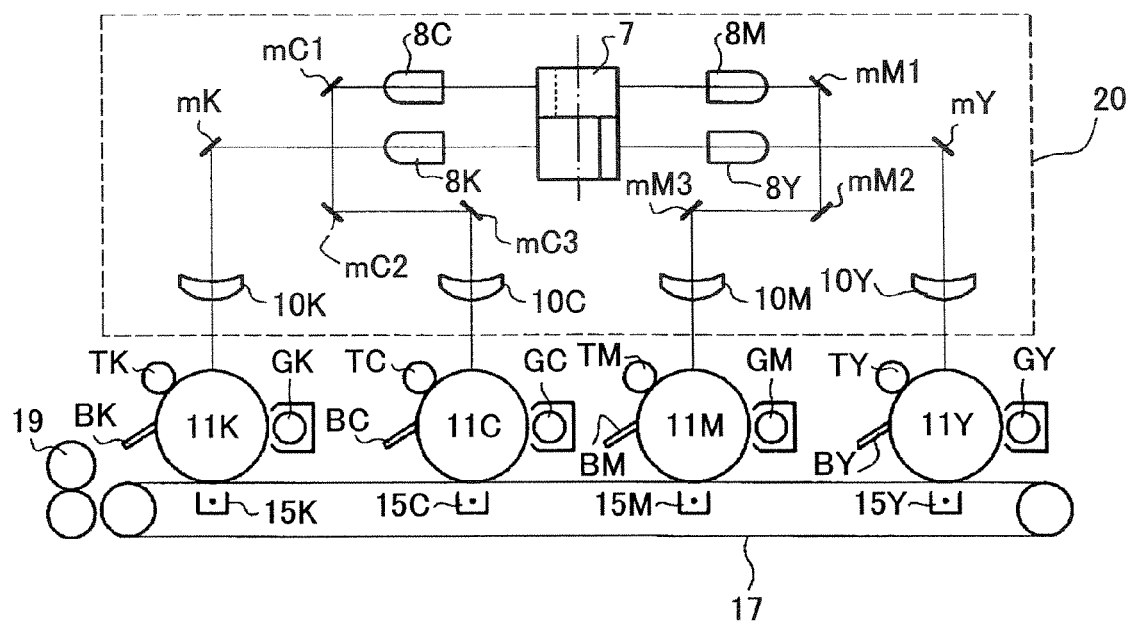
FIG. 16 is a schematic view illustrating operations of an image forming device including the optical deflector as shown in FIG. 15.

FIG. 16 is a schematic view illustrating operations of an image forming device including the optical deflector as shown in FIG. 15.

In FIG. 16, the optical deflector is indicated by a reference number 20, which has the same structure as described with reference to FIG. 15.

As shown in FIG. 16, one of the light beams deflected by the upper polygon mirror of the polygon mirror deflector 7 is guided through a light path bent by light-path bending mirrors mM1, mM2, and mM3 to a photoconductor 11M, which constitutes the physical substance of the scanning position. The other one of the light beams deflected by the upper polygon mirror of the polygon mirror deflector 7 is guided through a light path bent by light-path bending mirrors mC1, mC2, and mC3 to a photoconductor 11C, which constitutes the physical substance of the scanning position.

On the other hand, one of the light beams deflected by the lower polygon mirror of the polygon mirror deflector 7 is guided through a light path bent by a light-path bending mirror mY to a photoconductor 11Y, which constitutes the physical substance of the scanning position. The other one of the light beams deflected by the lower polygon mirror of the polygon mirror deflector 7 is guided through a light path bent by a light-path bending mirror mK to a photoconductor 11K, which constitutes the physical substance of the scanning position.

Therefore, each of the light beams from the semiconductor lasers 1YM, 1CK (m=2), each of which lasers emits only one (number of light beams p=1), is divided into two light beams in the sub-scan direction by the half-mirror prisms 4YM, 4CK, thus producing four light beams; and these four light beams scan four photoconductors 11Y, 11M, 11C, 11C. The photoconductors 11Y, 11M are alternately scanned by the two light beams generated by dividing the light beam from the semiconductor laser 1YM along with the rotation of the polygon mirror deflector 7, and the photoconductors 11C 11K are alternately scanned by the two light beams generated by dividing the light beam from the semiconductor laser 1CK along with the rotation of the polygon mirror deflector 7.

All of the photoconductors 11Y, 11M, 11C, 11K are rotated clock-wise at a constant speed, and are charged uniformly by charging rollers TY, TM, TC, TK, respectively, which serve as a charging unit. The photoconductors 11Y, 1M, 11C, 11K are scanned by the corresponding light beams, thereby forming electrostatic latent images (negative images) corresponding to the yellow, magenta, cyan, and black images.

The electrostatic latent images are developed by developing units GY, GM, GC, GK by reversal developing, resulting in yellow, magenta, cyan, and black toner images on the photoconductors 11Y, 11M, 11C, 11K.

These toner images are transferred to a transfer sheet (not illustrated). Specifically, the transfer sheet is conveyed by a conveyance belt 17, where a transfer unit 15Y, a transfer unit 15M, a transfer unit 15C, and a transfer unit 15K transfer the yellow toner image, magenta toner image, cyan toner image, and black toner image from the photoconductors 11Y, 11M, 11C, 11K, respectively, to the transfer sheet sequentially.

In this way, the yellow toner image, magenta toner image, cyan toner image, and black toner image are superposed and combined to form a color image. This color image is fused on the transfer sheet by a fusing unit 19 to form a color image.

As described above, in the present embodiment, electrostatic latent images are separately formed on plural photoconductors, namely, the photoconductors 11Y, 11M, 11C, 11K, by optically scanning the plural photoconductors; these electrostatic latent images are converted into visible toner images on the photoconductors 11Y, 11M, 11C, 11K, and these toner images are transferred to the same recording sheet and are combined there to form a color image. This is the so-called tandem-type image forming device. In such kind of image forming devices, there are four photoconductors 11Y, 11M, 11C, 11K. The optical scanning device in the image forming device has two semiconductor lasers 1YM, 1CK, and the light beam from each of the semiconductor lasers 1YM, 1CK scans two of the four photoconductors 11Y, 11M, 11C, 11K so that the electrostatic latent images formed on the four photoconductors 11Y, 11M, 11C, 11K are separately converted into visible toner images to form a color image. As a result, the number of parts and amount of materials in the light source are reduced, and thus the environmental impact is lowered. Furthermore, trouble in the light source can be effectively prevented.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

For example, in the above image forming device, the "single beam method" is used to scan each of the photoconductors, certainly the light source can be configured as shown in FIG. 11 to perform "multi-beam scanning" to scan the photoconductors.

This patent application is based on Japanese Priority Patent Application No. 2005-373604 filed on Dec. 26, 2005, the entire contents of which are hereby incorporated by reference.

What is claimed is:

1. An optical deflector, comprising:
 a rotary member that is supported by a bearing and is driven to rotate by a motor, a plurality of polygon mirrors being fixed on the rotary member, each of the polygon mirrors having a plurality of reflection surfaces;
 wherein
 the polygon mirrors are laminated in a direction of a rotation axis of the rotary member,
 the polygon mirrors are arranged so that each of the reflection surfaces of one of the polygon mirrors is offset relative to the corresponding one of the reflection surfaces of another one of the polygon mirrors by a predetermined angle in a rotation plane perpendicular to the rotation axis, and
 an effective deflection area of each of the reflection surfaces of any one of the polygon mirrors is positioned away from a center of the corresponding reflection surfaces of the other one of the polygon mirrors in the direction of the rotation axis.

2. The optical deflector as claimed in claim 1, wherein each of the reflection surfaces of each of the polygon mirrors has an arc-shaped boundary.

3. The optical deflector as claimed in claim 1, wherein the polygon mirrors are made individually, are fixed to a bearing shaft of the rotary member by shrinkage fit, and are integrated together.

4. The optical deflector as claimed in claim 1, wherein the polygon mirrors form a single part.

5. The optical deflector as claimed in claim 4, wherein the polygon mirror as a single part is machined by forging.

6. The optical deflector as claimed in claim 1, wherein corners of the reflection surfaces of the polygon mirrors on an interface with adjacent polygon mirrors are cut off.

7. The optical deflector as claimed in claim 6, wherein a surface formed by cutting off one of the corners of the reflection surfaces is a plane surface.

8. A method of fabricating an optical deflector having a rotary member that is supported by a bearing and is driven to rotate by a motor, a plurality of polygon mirrors being fixed on the rotary member, each of the polygon mirrors having a plurality of reflection surfaces, wherein the polygon mirrors are laminated in a direction of a rotation axis of the rotary member, the polygon mirrors are arranged so that each of the reflection surfaces of one of the polygon mirrors is offset relative to the corresponding one of the reflection surfaces of another one of the polygon mirrors by a predetermined angle in a rotation plane perpendicular to the rotation axis, and an effective deflection area of each of the reflection surfaces of any one of the polygon mirrors is positioned away from a center of the corresponding reflection surfaces of the other one of the polygon mirrors in the direction of the rotation axis, said method comprising the step of:

forming each of the reflection surfaces by mirror processing in a longitudinal direction of the reflection surface with the laminated polygon mirrors being integrated together.

9. An optical scanning device, comprising:

an optical system that includes an optical deflector and directs a light beam from a light source to a scanning surface through the optical system to form a light spot on the scanning surface, said optical deflector deflecting the light beam to form a scan line on the scanning surface;

wherein the optical deflector includes a rotary member that is supported by a bearing and is driven to rotate by a motor, a plurality of polygon mirrors being fixed on the rotary member, each of the polygon mirrors having a plurality of reflection surfaces, wherein the polygon mirrors are laminated in a direction of a rotation axis of the rotary member, the polygon mirrors are arranged so that each of the reflection surfaces of one of the polygon mirrors is offset relative to the corresponding one of the reflection surfaces of another one of the polygon mirrors by a predetermined angle in a rotation plane perpendicular to the rotation axis, and an effective deflection area of each of the reflection surfaces of any one of the polygon mirrors is positioned away from a center of the corresponding reflection surfaces of the other one of the polygon mirrors in the direction of the rotation axis.

10. An optical scanning device, comprising:

an optical system that includes an optical deflector and directs a plurality of light beams from a light source to a scanning surface through the optical system to form a plurality of light spots on the scanning surface, said optical deflector deflecting the light beams to form plural scan lines on the scanning surface;

wherein the optical deflector includes a rotary member that is supported by a bearing and is driven to rotate by a motor, a plurality of polygon mirrors being fixed on the rotary member, each of the polygon mirrors having a plurality of reflection surfaces, wherein the polygon mirrors are laminated in a direction of a rotation axis of the rotary member, the polygon mirrors are arranged so that each of the reflection surfaces of one of the polygon mirrors is offset relative to the corresponding one of the reflection surfaces of another one of the polygon mirrors by a predetermined angle in a rotation plane perpendicular to the rotation axis, and an effective deflection area of each of the reflection surfaces of any one of the polygon mirrors is positioned away from a center of the corresponding reflection surfaces of the other one of the polygon mirrors in the direction of the rotation axis.

11. An image forming device, comprising:

a photoconductor having a photoconductive surface;

an optical scanning device that directs a light beam from a light source to the photoconductor to scan the photoconductive surface and form a latent image on the photoconductive surface; and a unit that converts the latent image to a visible image;

wherein the optical scanning device includes an optical system that includes an optical deflector to deflect the light beam and form a scan line on the photoconductive surface of the photoconductor, the optical deflector includes a rotary member that is supported by a bearing and is driven to rotate by a motor, a plurality of polygon mirrors being fixed on the rotary member, each of the polygon mirrors having a plurality of reflection surfaces, wherein the polygon mirrors are laminated in a direction of a rotation axis of the rotary member, the polygon mirrors are arranged so that each of the reflection surfaces of one of the polygon mirrors is offset relative to the corresponding one of the reflection surfaces of another one of the polygon mirrors by a predetermined angle in a rotation plane perpendicular to the rotation axis, and an effective deflection area of each of the reflection surfaces of any one of the polygon mirrors is positioned away from a center of the corresponding reflection surfaces of the other one of the polygon mirrors in the direction of the rotation axis.

12. An image forming device, comprising:

a photoconductor having a photoconductive surface;

an optical scanning device that directs a plurality of light beams from a plurality of light sources to the photoconductor to scan the photoconductive surface and form a latent image on the photoconductive surface; and a unit that converts the latent image to a visible image; wherein the optical scanning device includes a scanning optical system that includes an optical deflector to deflect the light beams and form a plurality of scan lines on the photoconductive surface of the photoconductor, the optical deflector includes a rotary member that is supported by a bearing and is driven to rotate by a motor, a plurality of polygon mirrors being fixed on the rotary member, each of the polygon mirrors having a plurality of reflection surfaces, wherein the polygon mirrors are laminated in a direction of a rotation axis of the rotary member, the polygon mirrors are arranged so that each of the reflection surfaces of one of the polygon mirrors is offset relative to the corresponding one of the reflection surfaces of another one of the polygon mirrors by a predetermined angle in a rotation plane perpendicular to the rotation axis, and an effective deflection area of each of the reflection surfaces of any one of the polygon mirrors is positioned away from a center of the corresponding reflection surfaces of the other one of the polygon mirrors in the direction of the rotation axis.

* * * * *